(12) United States Patent
Zhu

(10) Patent No.: US 12,088,881 B2
(45) Date of Patent: Sep. 10, 2024

(54) METHOD AND DEVICE FOR PROCESSING PUBLIC EVENT THROUGH KEY DISTRIBUTION, AND SET TOP BOX

(71) Applicant: ZTE CORPORATION, Guangdong (CN)

(72) Inventor: Xingchang Zhu, Guangdong (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 61 days.

(21) Appl. No.: 17/633,611

(22) PCT Filed: Jul. 23, 2020

(86) PCT No.: PCT/CN2020/103848
§ 371 (c)(1),
(2) Date: Feb. 8, 2022

(87) PCT Pub. No.: WO2021/023020
PCT Pub. Date: Feb. 11, 2021

(65) Prior Publication Data
US 2022/0321952 A1    Oct. 6, 2022

(30) Foreign Application Priority Data
Aug. 8, 2019 (CN) .......................... 201910728506.7

(51) Int. Cl.
*H04N 21/443* (2011.01)
*H04N 21/4782* (2011.01)

(52) U.S. Cl.
CPC ..... *H04N 21/4438* (2013.01); *H04N 21/4782* (2013.01)

(58) Field of Classification Search
None
See application file for complete search history.

(56) References Cited

U.S. PATENT DOCUMENTS

| 2011/0099573 A1 | 4/2011 | Ellis et al. |
| 2014/0096158 A1* | 4/2014 | Chao .................. H04N 21/4316 725/37 |

(Continued)

FOREIGN PATENT DOCUMENTS

| CN | 101127756 A | 2/2008 |
| CN | 101763267 A | 6/2010 |

(Continued)

OTHER PUBLICATIONS

WIPO, International Search Report issued on Sep. 2, 2020.

(Continued)

*Primary Examiner* — Samira Monshi
(74) *Attorney, Agent, or Firm* — Li & Cai Intellectual Property (USA) Office

(57) ABSTRACT

The present disclosure provides a method and device for processing a public event through key distribution, and a set top box. The method includes: creating a sub window, and loading a third-party page to the sub window; displaying the sub window on a current page, and hiding a main window; and distributing a key message to the main window and the sub window, after receiving the key message; where the key message is used to enable the main window or the sub window to make a corresponding response based on a type of the key message.

10 Claims, 3 Drawing Sheets

(56) References Cited

U.S. PATENT DOCUMENTS

2015/0382047 A1   12/2015  Van Os et al.
2017/0300129 A1   10/2017  Lu
2018/0181566 A1*  6/2018  Lee .................... H04N 21/4147

FOREIGN PATENT DOCUMENTS

| CN | 103488486 A | 1/2014 |
|----|-------------|--------|
| CN | 103702223 A | 4/2014 |
| CN | 105867980 A | 8/2016 |
| JP | 2008288822 A | 11/2008 |

OTHER PUBLICATIONS

European Patent Office, EESR dated Apr. 6, 2023, for corresponding EP application No. 20851082.6.
China Patent Office, Second office action dated Mar. 25, 2023, for corresponding CN application No. 201910728506.7.

\* cited by examiner

METHOD AND DEVICE FOR PROCESSING PUBLIC EVENT THROUGH KEY DISTRIBUTION, AND SET TOP BOX

The present application is a National Stage of International Application No. PCT/CN2020/103848, filed on Jul. 23, 2020, which claims priority to Chinese Patent Application No. 201910728506.7 filed on Aug. 8, 2019, in Chinese Patent Office, both of which are incorporated by reference herein in their entireties.

TECHNICAL FIELD

The present disclosure relates to the field of Internet television technology.

BACKGROUND

At present, IPTV (Internet Protocol Television, also known as interactive Internet television) services have a large number of users, and have basically been fully popularized in China. With promotion and application of the services, various value-added services such as game, education, electronic mall and so on have been rapidly developed. In consideration of needs of operation and maintenance and rapid business launch, most value-added service clients adopt a B/S (Browser/Server) mode.

At the same time, in order to provide users with richer video contents, any operator is no longer a single content CP (Content Provider), but provides video contents by using a plurality of CPs at the same time. Each CP provides its own EPG (Electrical Program Guide), and jumps to its own EPG through an EPG page of a main CP to browse program information and video watching services.

With increase of online value-added services and continuous introduction of the plurality of CPs, great bottlenecks are encountered when a new function is launched. When a STB (set top box) and a service platform provide a new function experience, all client services of the current network must be modified to support the new function, which makes it very difficult to launch the new function. For example, a voice service, a suspended PIP (Picture-in-Picture) function, a one-click-to-main page function and other functions newly proposed by Big Video 3.0 require that a client page must be modified to support these functions, which makes it difficult for the functions to be fully online.

SUMMARY

According to one aspect of an embodiment of the present disclosure, provided is a method for processing a public event through key distribution, including: creating a sub window, and loading a third-party page to the sub window; displaying the sub window on a current page, and hiding a main window; and distributing a key message to the main window and the sub window, after receiving the key message. The key message is used to enable the main window or the sub window to make a corresponding response based on a type of the key message.

According to another aspect of the embodiment of the present disclosure, provided is a device for processing a public event through key distribution, including: a creation module, configured to create a sub window, and load a third-party page to the sub window; a display control module, configured to display the sub window on a current page, and hide a main window; and a key message processing module configured to distribute a key message to the main window and the sub window, after receiving the key message. The key message is used to enable the main window or the sub window to make a corresponding response based on a type of the key message.

According to another aspect of the embodiment of the present disclosure, provided is a STB, including a memory, a processor and a computer program stored on the memory and capable of being executed by the processor. When the computer program is executed by the processor, at least one step of the method for processing the public event through key distribution provided by the embodiment of the present disclosure is realized.

According to yet another aspect of the embodiment of the present disclosure, provided is a computer storage medium having a computer program stored thereon. When the computer program is executed by a processor, at least one step of the method for processing the public event through key distribution provided by the embodiment of the present disclosure is realized.

DETAILED DESCRIPTION

In order to further clarify the technical means adopted by the present disclosure to achieve intended purposes and the effects, the present disclosure is described in detail below in combination with the accompanying drawings and the preferred embodiment.

Figure 1:
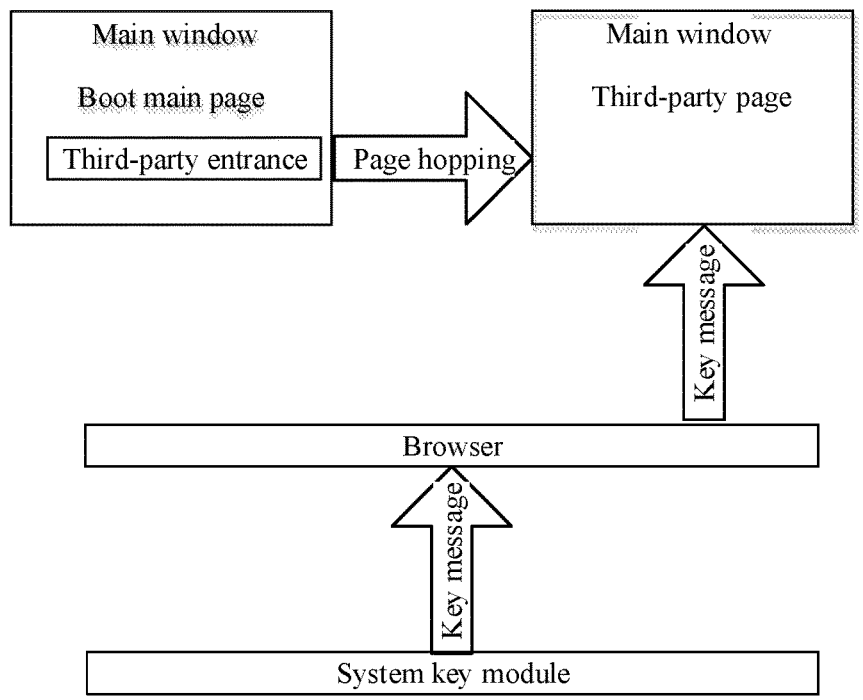
FIG. 1 is a schematic diagram of key message control of related art.
Figure 2:
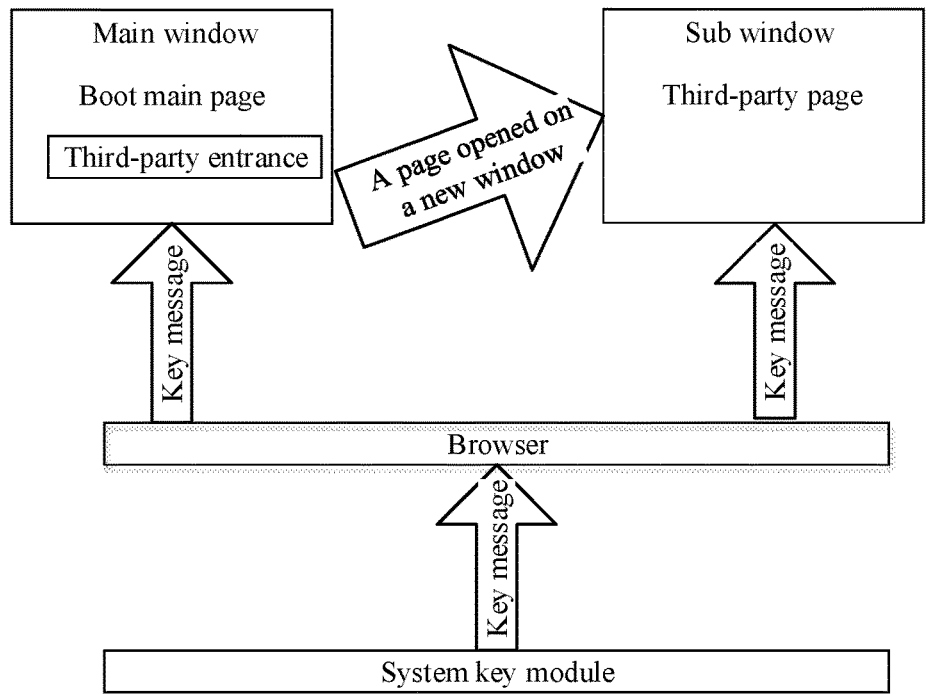
FIG. 2 is a schematic diagram of key message control provided by the embodiment of the present disclosure.

No matter in a Linux operating system or an Android operating system, a system key is only sent to a foreground window, and only the foreground window is able to receive a key message (including a virtual key). As shown in FIG. 1, it is a schematic diagram of key message control of related art. In the related art, when a third-party page is opened, an IPTV jumps to the third-party page through a main page and refreshes the main page. Therefore, when a STB displays pages of a value-added service and a third-party EPG in the foreground, only the third-party page receives the key message, and thus, the key message (including the virtual key) must be processed on these pages to support relevant functions.

Figure 3:
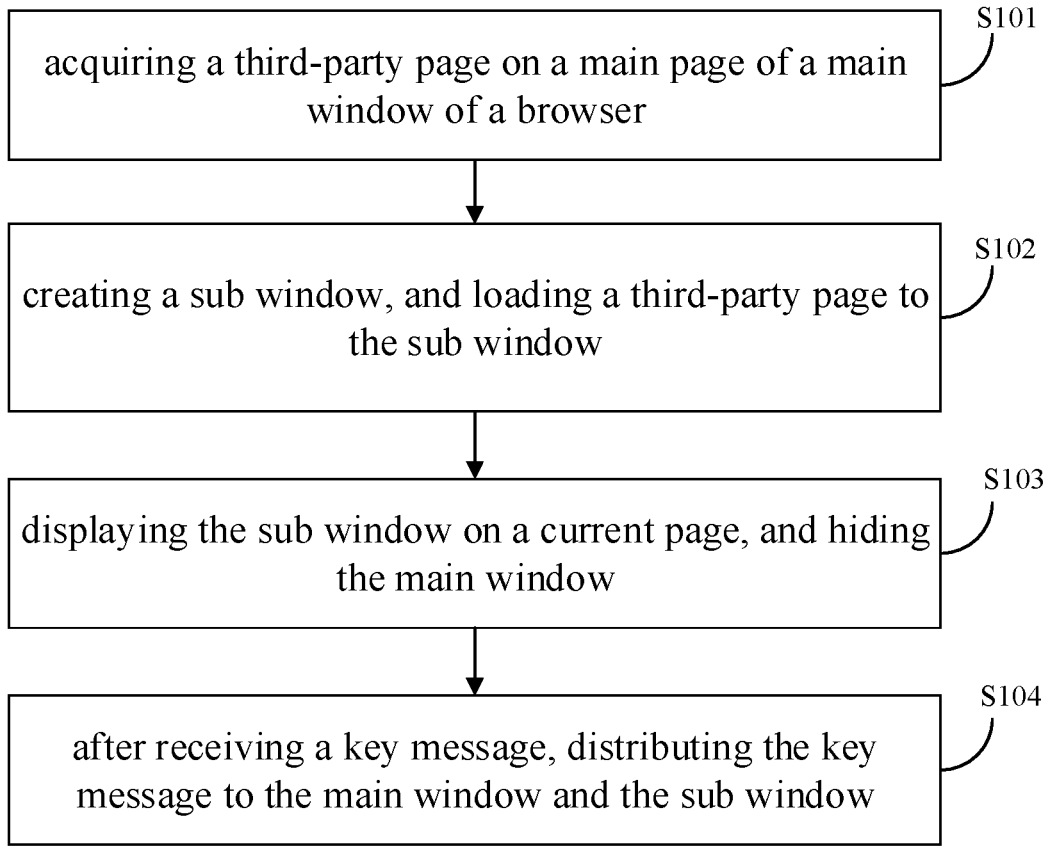
FIG. 3 is a flowchart of a method for processing a public event through key distribution provided by the embodiment of the present disclosure.

In order to solve a processing problem of a general public key message, the embodiment of the present disclosure provides a method for processing a public event through key distribution. As shown in FIG. 3, it is a flowchart of a method for processing a public event through key distribution provided by the embodiment of the present disclosure.

The method for processing the public event through key distribution includes steps S102 to S104.

In step S102, a sub window is created, and a third-party page is loaded to the sub window.

For example, the sub window may be opened on a main page through the Window.open, and the third-party page is displayed through the sub window.

In step S103, the sub window is displayed on a current page, and a main window is hidden. Thus, the main window and the sub window can be opened at the same time, and the main window is only hidden in the background.

In step S104, after receiving a key message, the key message is distributed to the main window and the sub window.

In the embodiment of the present disclosure, the key message is used to enable the main window or the sub window to make corresponding responses based on a type of the key message.

It should be noted that the method for processing a public event through key distribution of the present disclosure may be applied to an IPTV, a computer, or other electronic devices. According to the embodiment provided by the present disclosure, a system may be configured to, when the key message is received, distribute the key message to the sub window of the current window and the hidden main window. Thus, both the main window and the sub window can receive the key message. The "key message" described herein may be understood as a user pressing a key on a remote controller (including a virtual key), or a voice and other control message transmitted to an electronic device (such as the STB). When the main window and the sub window receive the key message, they can make corresponding responses according to the type of the key message.

According to the method for processing a public event through key distribution provided by the embodiment of the present disclosure, by obtaining the third-party page on the main page of the main window and creating the sub window, the third-party page is displayed in the current sub window and the main window is hidden. When the key message is received, the key message is distributed to the main window and the sub window, and the main window and the sub window make corresponding responses according to the type of the key message. Therefore, sending the key message to multiple windows is realized, so that the hidden main window can process the corresponding key message, which solves the problem that a third-party value-added service must be adapted when a new function is launched, and greatly improves an online efficiency of the new function.

In the embodiment of the present disclosure, as shown in FIG. 3, before creating the sub window, the method may further include step S101.

In step S101, the third-party page is acquired on the main page of the main window of a browser.

For example, when the method is applied to the IPTV, the STB is opened, and after a STB login authentication is successful, the main page of a main page template may be opened through the browser, and the third-party value-added service or an EPG may be selected on the main page to obtain the third-party page.

Figure 4:
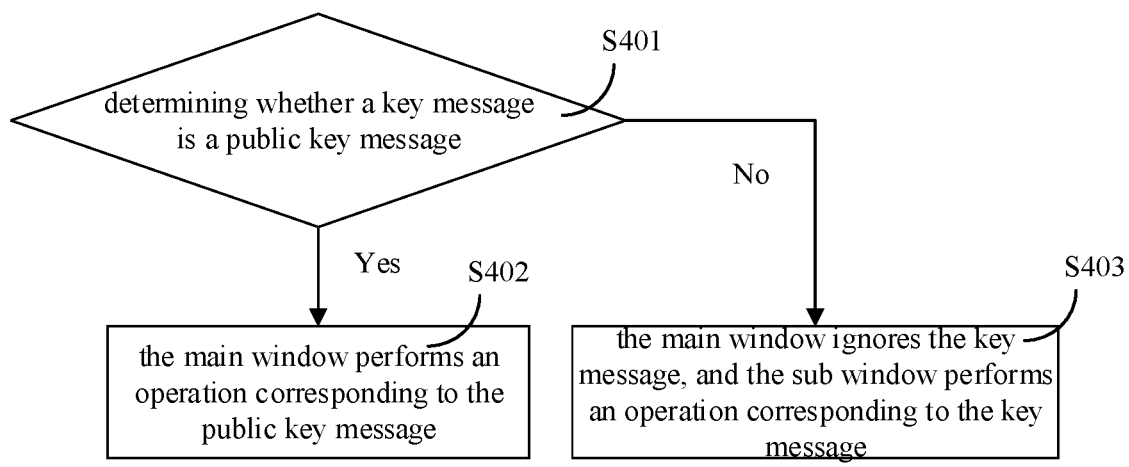
FIG. 4 is a flowchart of a method of making responses by a main window and a sub window according to a type of a key message provided by the embodiment of the present disclosure.

As shown in FIG. 4, it is a flowchart of a method of making responses by the main window and the sub window according to the type of the key message provided by the embodiment of the present disclosure.

According to the embodiment provided by the present disclosure, making corresponding responses by the main window and the sub window according to the type of the key message may include steps S401 to S403.

In step S401, it is determined whether the key message is a public key message; if it is, the process proceeds to step S402; and if it is not, the process proceeds to step S403.

In step S402, the main window performs an operation corresponding to the public key message.

In step S403, the main window ignores the key message, and the sub window performs an operation corresponding to the key message.

Thus, the main window can receive the public key message and perform the corresponding operation.

In some exemplary examples, the public key message may be a voice message, a picture in picture switching control message, or a control message such as returning to the main page.

In the embodiment of the present disclosure, the method may further include: if the key message is the public key message, the sub window is closed, and the main window performs the operation corresponding to the public key message.

It should be noted that when the key message is the public key message and the main window performs the operation corresponding to the public key message, it may be necessary to close the sub window. For example, when the public key message is to return to the main page or a voice control for searching a program, it is necessary to close the third-party page in the current sub window and switch to a corresponding window page.

In the embodiment of the present disclosure, the method may further include: when displaying the sub window on the current page and hiding the main window, a state of the sub window displayed on the current page is recorded as a third-party page state.

It should be noted that when the third-party page is displayed in the sub window and the main window is hidden, the main window may record the current window as the third-party page state, so that the main window is able to process the corresponding operation when the key message is received. For example, when the main window receives a non-public key message (such as a direction key control message, etc.), the main window first determines whether the current window is in the third-party page state. If it is, the key message is discarded, and the sub window performs the operation corresponding to the key message (such as direction control).

Figure 5:
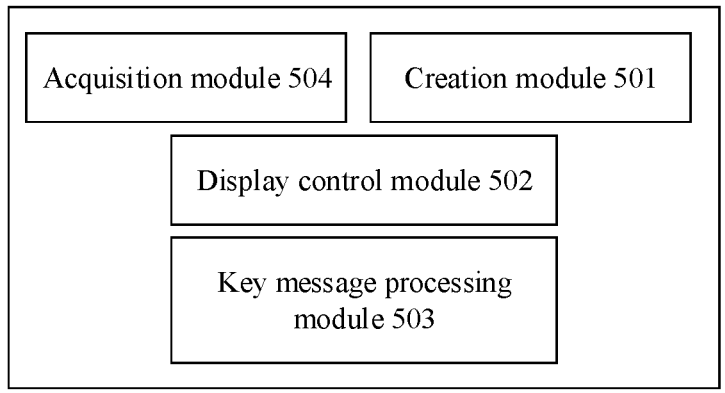
FIG. 5 is a structural diagram of a device for processing a public event through key distribution provided by the embodiment of the present disclosure.
Figure 6:
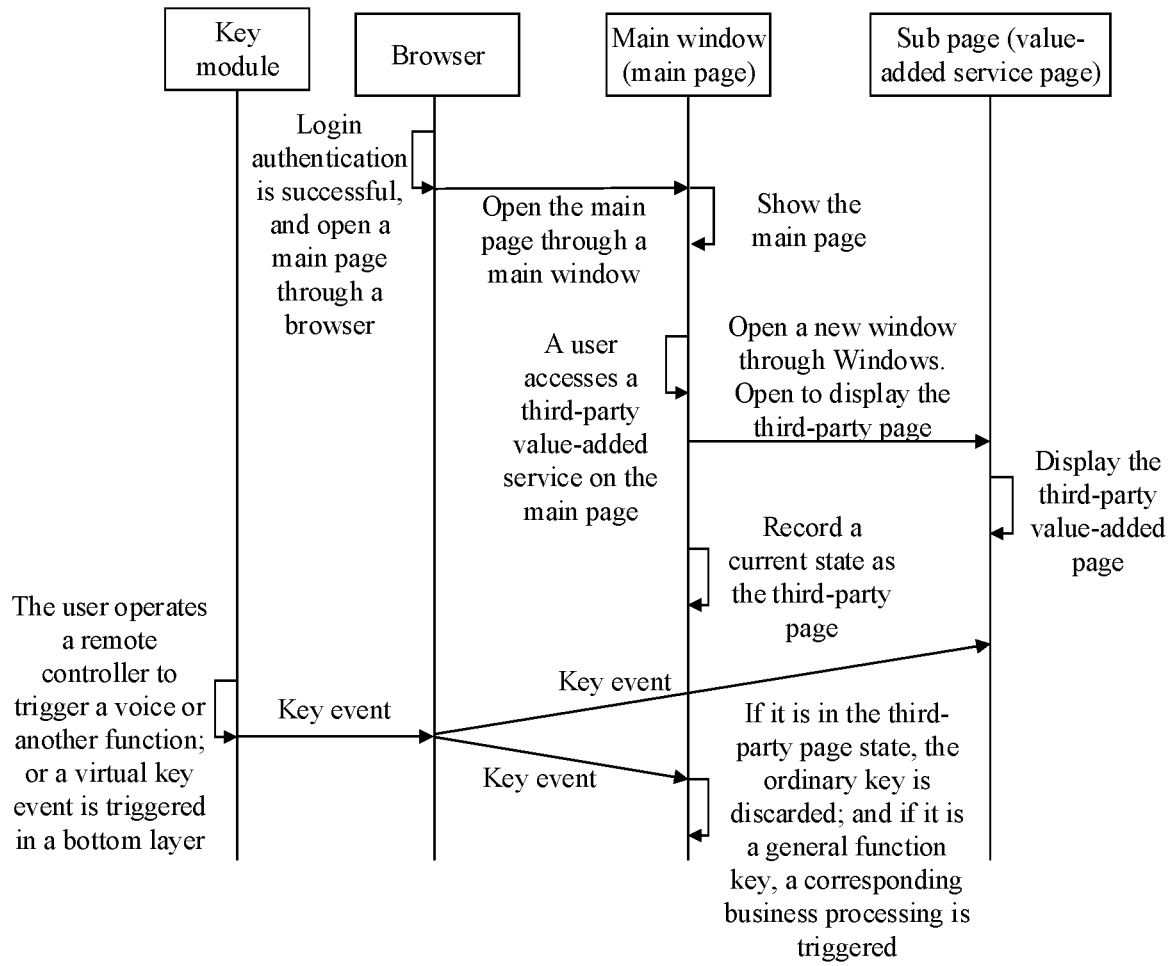
FIG. 6 is a flowchart of processing of a public event through key distribution provided by the embodiment of the present disclosure.

The embodiment of the present disclosure further provides a device for processing a public event through key distribution. As shown in FIG. 5, it is a structural diagram of a device for processing a public event through key distribution provided by the embodiment of the present disclosure. The device for processing a public event through key distribution includes: a creation module 501, a display control module 502, and a key message processing module 503.

In the embodiment of the present disclosure, the creation module 501 is configured to create the sub window, and load the third-party page to the sub window.

For example, the creation module 501 may open the sub window on the main page through the Window.open, and display the third-party page through the sub window.

The display control module 502 is configured to display the sub window on the current page, and hide the main window. Thus, the main window and the sub window can be opened at the same time, and the main window is only hidden in the background.

The key message processing module 503 is configured to, after receiving the key message, distribute the key message to the main window and the sub window.

In the embodiment of the present disclosure, the key message is used to enable the main window or the sub window to make corresponding responses based on the type of the key message.

It should be noted that the method for processing a public event through key distribution of the present disclosure may be applied to the IPTV, the computer, or other electronic devices. The system may be configured to, when the key message is received, distribute the key message to the sub window of the current window and the hidden main window. Thus, both the main window and the sub window can receive the key message. The "key message" described herein may be understood as the user pressing the key on the remote controller (including the virtual key), or the voice and other control message transmitted to the electronic device (such as the STB). When the main window and the sub window receive the key message, they can make corresponding responses according to the type of the key message.

According to the device for processing the public event through key distribution provided by the embodiment of the present disclosure, by obtaining the third-party page on the main page of the main window and creating the sub window, the third-party page is displayed in the current sub window and the main window is hidden. When the key message is received, the key message is distributed to the main window and the sub window, and the main window and the sub window make corresponding responses according to the type of the key message. Therefore, sending the key message to multiple windows is realized, so that the hidden main window can process the corresponding key message, which solves the problem that a third-party value-added service must be adapted when a new function is launched, and greatly improves the online efficiency of the new function.

In the embodiment of the present disclosure, the device may further include an acquisition module 504. The acquisition module 504 may be configured to acquire the third-party page on the main page of the main window of a browser, before the sub window is created.

For example, when the device is applied to the IPTV, the STB is opened, and after a STB login authentication is successful, the main page of a main page template may be opened through the browser, and the third-party value-added service or an EPG may be selected on the main page to obtain the third-party page.

According to the embodiment of the present disclosure, the key message processing module 503 may be specifically configured to determine whether the key message is a public key message; if it is, make the main window perform an operation corresponding to the public key message; and if it is not, make the main window ignore the key message and the sub window perform an operation corresponding to the key message. Thus, the main window can receive the public key message and perform the corresponding operation.

In the embodiment of the present disclosure, the public key message may be a voice message, a picture in picture switching control message, or a control message such as returning to the main page.

In the embodiment of the present disclosure, the key message processing module 503 may be further configured to, if the key message is the public key message, close the sub window, and make the main window perform the operation corresponding to the public key message.

It should be noted that when the key message is the public key message and the main window performs the operation corresponding to the public key message, it may be necessary to close the sub window. For example, when the public key message is to return to the main page or a voice control for searching a program, it is necessary to close the third-party page in the current sub window and switch to a corresponding window page.

In the embodiment of the present disclosure, the device may further include a setting module (not shown in FIG. 5), when the sub window is displayed on the current page and the main window is hidden, the setting module records a state of the sub window displayed on the current page as a third-party page state.

It should be noted that when the third-party page is displayed in the sub window and the main window is hidden, the main window may record the current window as the third-party page state, so that the main window is able to process the corresponding operation when the key message is received. For example, when the main window receives a non-public key message (such as a direction key control message, etc.), the main window first determines whether the current window is in the third-party page state. If it is, the key message is discarded, and the sub window performs the operation corresponding to the key message (such as direction control).

The embodiment of the present disclosure further provides a STB, and the STB includes a memory, a processor and a computer program stored on the memory and capable of being executed by the processor. When the computer program is executed by the processor, at least one step of the method for processing a public event through key distribution provided by the embodiment of the present disclosure is realized.

According to the STB provided by the embodiment of the present disclosure, by obtaining the third-party page on the main page of the main window and creating the sub window, the third-party page is displayed in the current sub window and the main window is hidden. When the key message is received, the key message is distributed to the main window and the sub window, and the main window and the sub window make corresponding responses according to the type of the key message. Therefore, sending the key message to multiple windows is realized, so that the hidden main window can process the corresponding key message, which solves the problem that the third-party value-added service must be adapted when the new function is launched, greatly improves the online efficiency of the new function, and improves the overall performance of the STB.

The embodiment of the present disclosure further provides a computer storage medium having a computer program stored thereon. When the computer program is executed by a processor, at least one step of the method for processing a public event through key distribution provided by the embodiment of the present disclosure is realized.

According to the computer storage medium provided by the embodiment of the present disclosure, sending the key message to multiple windows is realized, so that the hidden main window can process the corresponding key message, which solves the problem that the third-party value-added service must be adapted when the new function is launched, and greatly improves the online efficiency of the new function.

Through the description of the specific embodiment, it should be possible to have a more in-depth and specific understanding of the technical means adopted by the present disclosure to achieve the intended purpose and the effects.

However, the attached drawings are only for reference and explanation, not for limiting the present disclosure.

What is claimed is:

1. A method for processing a public event through key distribution, comprising:
creating a sub window, and loading a third-party page to the sub window;
displaying the sub window on a top page, and hiding a main window; and
distributing a key message to the hidden main window and the sub window, after receiving the key message;
wherein the key message is used to enable the hidden main window or the sub window to make a corresponding response based on a type of the key message,
wherein the hidden main window or the sub window making the corresponding response based on the type of the key message, comprises:
determining whether the key message is a public key message;
closing or hiding the sub window, and making the hidden main window perform an operation corresponding to the public key message, in response to determining that the key message is the public key message; the public key message is a control message of a user for performing the operation on a main page of the hidden main window, and
making the hidden main window ignore the key message and the sub window perform an operation corresponding to the key message, in response to determining that the key message is a non-public key message, the non-public key message is a control message of a user for performing the operation on the third-party page of the sub window.

2. The method for processing the public event through key distribution of claim 1, before creating the sub window, further comprising:
acquiring the third-party page on a main page of the main window of a browser.

3. The method for processing the public event through key distribution of claim 1, further comprising:
recording a state of the sub window displayed on the top page as a third-party page state, when displaying the sub window on the top page and hiding the main window.

4. A set top box, comprising a memory, a processor and a computer program stored on the memory and capable of being executed by the processor, wherein when the computer program is executed by the processor, the following steps are realized:
creating a sub window, and loading a third-party page to the sub window;
displaying the sub window on a top page, and hiding a main window; and
distributing a key message to the hidden main window and the sub window, after receiving the key message;
wherein the key message is used to enable the hidden main window or the sub window to make a corresponding response based on a type of the key message,
wherein the hidden main window or the sub window making the corresponding response based on the type of the key message, comprises:
determining whether the key message is a public key message;
closing or hiding the sub window, and making the hidden main window perform an operation corresponding to the public key message, in response to determining that the key message is the public key message, the public key message is a control message of a user for performing the operation on a main page of the hidden main window; and
making the hidden main window ignore the key message and the sub window perform an operation corresponding to the key message, in response to determining that the key message is a non-public key message, the non-public key message is a control message of a user for performing the operation on the third-party page of the sub window.

5. A non-transitory computer-readable storage medium having a computer program stored thereon, wherein when the computer program is executed by a processor, the following steps are realized:
creating a sub window, and loading a third-party page to the sub window;
displaying the sub window on a top page, and hiding a main window; and
distributing a key message to the hidden main window and the sub window, after receiving the key message;
wherein the key message is used to enable the hidden main window or the sub window to make a corresponding response based on a type of the key message,
wherein the hidden main window or the sub window making the corresponding response based on the type of the key message, comprises:
determining whether the key message is a public key message;
closing or hiding the sub window, and making the hidden main window perform an operation corresponding to the public key message, in response to determining that the key message is the public key message, the public key message is a control message of a user for performing the operation on a main page of the hidden main window; and
making the hidden main window ignore the key message and the sub window perform an operation corresponding to the key message, in response to determining that the key message is a non-public key message, the non-public key message is a control message of a user for performing the operation on the third-party page of the sub window.

6. The set top box of claim 4, wherein the processor is configured to execute the computer program to implement:
acquiring the third-party page on a main page of the main window of a browser.

7. The set top box of claim 4, wherein the processor is configured to execute the computer program to implement:
recording a state of the sub window displayed on the top page as a third-party page state, when displaying the sub window on the top page and hiding the main window.

8. The non-transitory computer-readable storage medium of claim 5, wherein when the computer program is executed by the processor, the following steps are realized:
determining whether the key message is a public key message;
closing or hiding the sub window, and making the hidden main window perform an operation corresponding to the public key message, in response to determining that the key message is the public key message; and
making the hidden main window ignore the key message and the sub window perform an operation corresponding to the key message, in response to determining that the key message is a non-public key message.

9. The non-transitory computer-readable storage medium of claim 5, wherein when the computer program is executed by the processor, the following step is realized:
   acquiring the third-party page on a main page of the main window of a browser.

10. The non-transitory computer-readable storage medium of claim 5, wherein when the computer program is executed by the processor, the following step is realized:
   recording a state of the sub window displayed on the top page as a third-party page state, when displaying the sub window on the top page and hiding the main window.

* * * * *